United States Patent
Okubo et al.

(10) Patent No.: US 10,526,673 B2
(45) Date of Patent: Jan. 7, 2020

(54) NON-ORIENTED ELECTRICAL STEEL SHEET AND METHOD FOR PRODUCING THE SAME, AND MOTOR CORE AND METHOD OF PRODUCING THE SAME

(71) Applicant: JFE STEEL CORPORATION, Tokyo (JP)

(72) Inventors: Tomoyuki Okubo, Kurashiki (JP); Tadashi Nakanishi, Kurashiki (JP); Yoshihiko Oda, Kurashiki (JP); Shinji Koseki, Kawasaki (JP)

(73) Assignee: JFE STEEL CORPORATION, Tokyo (JP)

( * ) Notice: Subject to any disclaimer, the term of this patent is extended or adjusted under 35 U.S.C. 154(b) by 561 days.

(21) Appl. No.: 15/329,938

(22) PCT Filed: Jun. 1, 2015

(86) PCT No.: PCT/JP2015/065761
§ 371 (c)(1),
(2) Date: Jan. 27, 2017

(87) PCT Pub. No.: WO2016/017263
PCT Pub. Date: Feb. 4, 2016

(65) Prior Publication Data
US 2017/0260600 A1 Sep. 14, 2017

(30) Foreign Application Priority Data

Jul. 31, 2014 (JP) ................................. 2014-155899
Feb. 20, 2015 (JP) ................................. 2015-031521

(51) Int. Cl.
| | | |
|---|---|---|
| C21D 9/46 | (2006.01) |
| C21D 9/00 | (2006.01) |
| C21D 8/12 | (2006.01) |
| C22C 38/00 | (2006.01) |
| C22C 38/02 | (2006.01) |
| C22C 38/04 | (2006.01) |
| C22C 38/06 | (2006.01) |
| C22C 38/60 | (2006.01) |
| C21D 1/30 | (2006.01) |
| H02K 1/02 | (2006.01) |
| H02K 15/02 | (2006.01) |

(52) U.S. Cl.
CPC ............ $C21D\ 9/0068$ (2013.01); $C21D\ 1/30$ (2013.01); $C21D\ 8/1222$ (2013.01); $C21D\ 8/1233$ (2013.01); $C21D\ 8/1261$ (2013.01); $C21D\ 8/1266$ (2013.01); $C21D\ 9/46$ (2013.01); $C22C\ 38/001$ (2013.01); $C22C\ 38/002$ (2013.01); $C22C\ 38/005$ (2013.01); $C22C\ 38/008$ (2013.01); $C22C\ 38/02$ (2013.01); $C22C\ 38/04$ (2013.01); $C22C\ 38/06$ (2013.01); $C22C\ 38/60$ (2013.01); $H02K\ 1/02$ (2013.01); $H02K\ 15/02$ (2013.01)

(58) Field of Classification Search
CPC ........................................................ C21D 9/46
See application file for complete search history.

(56) References Cited

U.S. PATENT DOCUMENTS

| | | | |
|---|---|---|---|
| 9,947,446 B2 * | 4/2018 | Toda ........................ | C21D 8/12 |
| 10,242,782 B2 * | 3/2019 | Toda .................... | C21D 8/1272 |
| 2015/0213928 A1 | 7/2015 | Toda et al. | |

FOREIGN PATENT DOCUMENTS

| | | | |
|---|---|---|---|
| CA | 2 884 851 A1 | 4/2014 | |
| CN | 1556869 A | 12/2004 | |
| JP | 2002-003944 A | 1/2002 | |
| JP | 2004-292829 A | 10/2004 | |
| JP | 2004-339537 A | 12/2004 | |
| JP | 2005-200713 A | 7/2005 | |
| JP | 2005-200756 A | 7/2005 | |
| JP | 2012140676 A | 7/2012 | |
| JP | 2012-149337 A | 8/2012 | |
| WO | 2004/013365 A1 | 2/2004 | |
| WO | 2014/024222 A1 | 2/2014 | |
| WO | WO-2014061246 A1 * | 4/2014 | ............... C21D 8/12 |

OTHER PUBLICATIONS

Feb. 20, 2018 Office Action issued in Canadian Application No. 2,956,686.
Oct. 31, 2017 Office Action issued in Chinese Patent Application No. 201580040897.3.
Sep. 1, 2015 International Search Report issued in International Patent Application No. PCT/JP2015/065761.
Dec. 27, 2016 Office Action issued in Japanese Patent Application No. 2015-552935.
Jun. 8, 2017 Extended Search Report issued with European Patent Application No. 15827958.8.

* cited by examiner

Primary Examiner — Jophy S. Koshy
(74) Attorney, Agent, or Firm — Oliff PLC

(57) ABSTRACT

A non-oriented electrical steel sheet is obtained by subjecting a slab containing C: not more than 0.005 mass %, Si: 1.0-5.0 mass %, Mn: 0.04-3.0 mass %, sol. Al: not more than 0.005 mass %, P: 0.03-0.2 mass %, S: not more than 0.005 mass %, N: not more than 0.005 mass %, B: not more than 0.001 mass %, and Se: not more than 0.001 mass % and satisfying sol. Al+C+5B+5Se≤0.005 mass % to hot rolling, cold rolling and finish annealing. A sheet temperature at the outlet side of the rolling machine in at least one pass of the final cold rolling is set to a range of 100-300° C. to provide S/2M of not less than 1.0 and S/5C of not less than 1.0 when X-ray intensity ratios of {001}<250>, {111}<112> and {001}<100> in a central layer in a thickness direction are S, M and C, respectively.

16 Claims, 1 Drawing Sheet

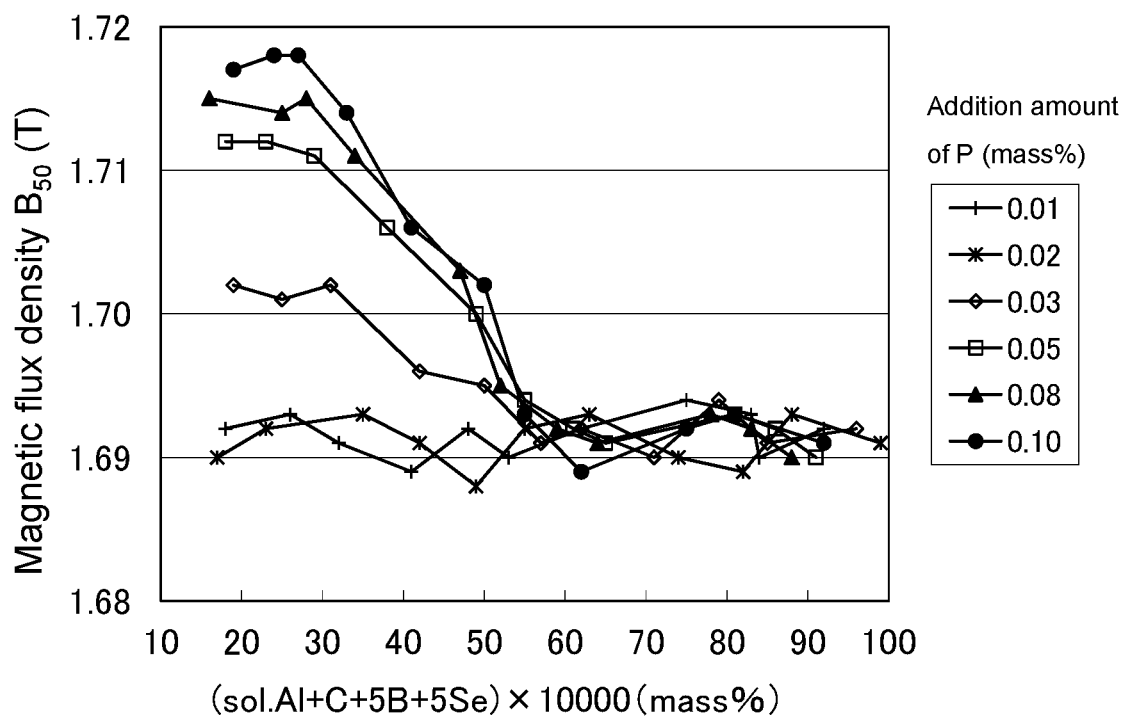

NON-ORIENTED ELECTRICAL STEEL SHEET AND METHOD FOR PRODUCING THE SAME, AND MOTOR CORE AND METHOD OF PRODUCING THE SAME

TECHNICAL FIELD

This invention relates to a non-oriented electrical steel sheet having excellent magnetic properties used as an iron core for motors, transformers and the like and a method for producing the same, as well as a motor core using the non-oriented electrical steel sheet and a method of producing the same.

RELATED ART

Recently, it is strongly demanded to reduce consumption energy in many fields from the viewpoint of environmental problems and cost reduction. With this demand, non-oriented electrical steel sheets as a soft-magnetic material widely used as an iron core for motors, transformers and the like have been demanded to have a low iron loss and a high magnetic flux density.

In order to reduce the iron loss of the non-oriented electrical steel sheets, it is effective to increase an addition amount of Si, Al or the like to thereby increase an electric resistance of the steel sheet. It is because that eddy current loss caused by magnetization of the steel sheet is decreased as the electric resistance is increased. However, the magnetic flux density is decreased by adding a large amount of Si or Al, which causes new problems such as decrease of motor torque, increase of copper loss and the like.

Therefore, there have hitherto been conducted positive research and development for improving the texture of the steel sheet to increase the magnetic flux density. In order to increase the magnetic flux density, it is effective to increase <001> as an axis of easy magnetization in a direction parallel to the steel sheet surface and decrease <111> or <110> as an axis of hard magnetization, or to develop the texture having good magnetic properties, concretely the texture wherein there are many {100} faces parallel to the sheet surface and many magnetization easy axes <001> exist in the sheet surface.

As a method for developing such a texture, for example, Patent Document 1 proposes a method of decreasing an Al content as much as possible and further performing warm-rolling, and Patent Document 2 proposes a method of adding P into steel and conducting a batch annealing at a low temperature for a long time before cold rolling.

PRIOR ART DOCUMENTS

Patent Documents

Patent Document 1: JP-A-2002-003944
Patent Document 2: JP-A-2005-200756

SUMMARY OF THE INVENTION

Task to be Solved by the Invention

According to the research and study by the inventors, however, the method proposed in Patent Document 1 provides the effect of increasing the magnetic flux density to a certain degree, but is necessary to be further improved for meeting severer requirements in recent years. Also, since the batch annealing at a low temperature for a long time is required in the method in Patent Document 2, there are problems of causing a decrease of the productivity and an increase of the production cost.

The invention is made in view of the aforementioned problems inherent to the conventional techniques, and is to stably provide a non-oriented electrical steel sheet having excellent magnetic properties suitable for use in motors, transformers and the like while suppressing the increase of the cost as much as possible and to propose an advantageous method of producing such a non-oriented electrical steel sheet.

Solution for Task

The inventors have made various studies on the method for improving the magnetic properties of the non-oriented electrical steel sheet. As a result, it has been found out that the texture suitable for the magnetic properties can be developed by adding P to the steel sheet and further decreasing Al, C and B contents as an element suppressing P segregation and hence non-oriented electrical steel sheets having a high magnetic flux density can be obtained, and the invention has been accomplished.

That is, the invention is a non-oriented electrical steel sheet having a chemical composition comprising C: not more than 0.005 mass %, Si: 1.0-5.0 mass %, Mn: 0.04-3.0 mass %, sol. Al: not more than 0.005 mass %, P: 0.03-0.2 mass %, S: not more than 0.005 mass %, N: not more than 0.005 mass %, B: not more than 0.001 mass %, Se: not more than 0.001 mass %, provided that sol. Al, C, B and Se satisfy the following equation:

$$\text{sol. Al} + C + 5B + 5Se \le 0.005 \text{ mass \%},$$

and the remainder being Fe and inevitable impurities, characterized in that when X-ray intensity ratios of {001}<250>, {111}<112> and {001}<100> in a central layer in a thickness direction are defined S, M and C, respectively, S/2M is not less than 1.0 and S/5C is not less than 1.0.

The non-oriented electrical steel sheet according to the invention is characterized by containing one or two selected from Sn: 0.01-0.2 mass % and Sb: 0.01-0.2 mass % in addition to the above chemical composition.

The non-oriented electrical steel sheet according to the invention is characterized by containing one or more selected from REM: 0.0005-0.005 mass %, Mg: 0.0005-0.005 mass % and Ca: 0.0005-0.005 mass % in addition to the above chemical composition.

The non-oriented electrical steel sheet according to the invention is characterized in that the thickness of the steel sheet is 0.05-0.30 mm.

The non-oriented electrical steel sheet according to the invention is characterized in that an average crystal grain size is less than 40 m.

Further, the invention proposes a method of producing a non-oriented electrical steel sheet comprising a series of steps of hot rolling a steel slab having any one of the above chemical compositions, conducting a hot band annealing at a soaking temperature of 800-1200° C. for a soaking time of not more than 5 minutes, performing one cold rolling or two or more cold rollings interposing an intermediate annealing therebetween to obtain a cold rolled sheet with a final thickness and subjecting the sheet to finish annealing, characterized in that a temperature of the sheet at an outlet side of a rolling machine in at least one pass of the final cold rolling is within a range of 100-300° C.

The method of producing a non-oriented electrical steel sheet according to the invention is characterized in that a rolling reduction of the final cold rolling is not less than 80%.

Also, the method of producing a non-oriented electrical steel sheet according to the invention is characterized in that a soaking temperature in the finish annealing is not lower than 600° C. but lower than 900° C.

Furthermore, the invention is a motor core comprising a stator core and a rotor core formed by laminating any of the non-oriented electrical steel sheets described above, characterized in that an average crystal grain size of the rotor core is less than 40 μm and an average crystal grain size of the stator core is not less than 40 μm.

Moreover, the invention proposes a method of producing a motor core comprising a stator core and a rotor core formed by laminating the above non-oriented electrical steel sheet with an average crystal grain size of less than 40 μm, characterized in that an average crystal grain size of the stator core is made to not less than 40 μm by subjecting the stator core to a stress-relief annealing.

Effect of the Invention

According to the invention, non-oriented electrical steel sheets having a high magnetic flux density can be stably produced without increasing the production cost.

BRIEF DESCRIPTION OF THE DRAWING

FIG. 1 is a graph showing an influence of P content upon a relation between sol. Al, C, B and Se contents and magnetic flux density $B_{50}$.

EMBODIMENTS FOR CARRYING OUT THE INVENTION

First, there will be described experiments getting the development of the invention.

Experiment 1

A steel containing Si: 3.35 mass % and Mn: 0.25 mass % as a basic ingredient and further containing C, P, sol. Al, B and Se in a range of C: 0.0005-0.0100 mass %, P: 0.01-0.2 mass %, sol. Al: 0.001-0.005 mass %, B: 0.00001-0.00020 mass % and Se: 0.00001-0.00020 mass %, respectively, is melted in a vacuum melting furnace and casted to provide a steel ingot. In this case, N and S contents in all steel ingots are controlled to a range of 0.002-0.003 mass %.

Then, the steel ingot is heated at 1100° C. for 30 minutes and hot rolled to form a hot rolled sheet having a sheet thickness of 1.9 mm, which is subjected to a hot band annealing simulating a continuous annealing of soaking at 1000° C. for 30 seconds and cooling to room temperature at a cooling rate of 30° C./sec. Thereafter, the sheet is pickled to remove scales and cold rolled to obtain a cold rolled sheet having a final thickness of 0.20 mm.

In the cold rolling, the material steel sheet (hot rolled sheet) is previously heated so as to render a sheet temperature at the outlet side of the rolling machine into 150-200° C., and then subjected to the first cold rolling for rolling to 0.50 mm and the second cold rolling (final cold rolling) at a temperature of not higher than 100° C. to obtain a cold rolled sheet with a final thickness of 0.20 mm.

After the cold rolled sheet thus obtained is subjected to a finish annealing at 1000° C. for 30 seconds, a magnetic flux density $B_{50}$ is measured by an Epstein test.

In FIG. 1 are shown the measurement results every each P content, in which a lateral axis is (sol. Al+C+5B+5Se) and a longitudinal axis is a magnetic flux density $B_{50}$.

As seen from FIG. 1, the magnetic flux density $B_{50}$ can be increased in the steel sheet containing not less than 0.03 mass % of P by decreasing (sol. Al+C+5B+5Se) to not more than 0.005 mass %.

In order to investigate the cause on the above effect of increasing the magnetic flux density, the hot band annealed sheet used in the above experiment is cut at a low temperature and a cross section thereof is analyzed by an Auger electron spectroscopy, from which it can be seen that a large amount of P is segregated into the grain boundary in the steel sheets having a high magnetic flux density.

Also, Table 1 shows the results obtained by investigating a texture of a central portion in the thickness direction of the steel sheet after the finish annealing by an X-ray for steels having (sol. Al+C+5B+5Se) of 0.00255-0.00275 mass %. As seen from the table, the steel sheets exhibiting a high magnetic flux density are high in {001}<250> and low in {111}<112> and {001}<100>, that is, they have such a characteristic texture that S is high and M and C are low.

TABLE 1

| Steel sheet No. | Chemical composition (mass %) | | | | | | Magnetic flux density $B_{50}$ (T) | Texture | |
|---|---|---|---|---|---|---|---|---|---|
| | P | sol. Al | C | B | Se | sol. Al + C + 5B + 5Se | | S/2M | S/5C |
| 1 | 0.01 | 0.0011 | 0.0012 | 0.00006 | 0.00001 | 0.00265 | 1.693 | 0.89 | 0.83 |
| 2 | 0.02 | 0.0005 | 0.0017 | 0.00002 | 0.00005 | 0.00255 | 1.692 | 0.82 | 0.84 |
| 3 | 0.03 | 0.0006 | 0.0012 | 0.00008 | 0.00011 | 0.00275 | 1.701 | 1.11 | 1.25 |
| 4 | 0.05 | 0.0009 | 0.0012 | 0.00004 | 0.00008 | 0.00270 | 1.712 | 1.51 | 1.52 |
| 5 | 0.08 | 0.0008 | 0.0014 | 0.00003 | 0.00007 | 0.00270 | 1.714 | 1.53 | 2.15 |
| 6 | 0.10 | 0.0007 | 0.0016 | 0.00002 | 0.00003 | 0.00255 | 1.718 | 1.65 | 2.84 |

Experiment 2

A steel having a chemical composition containing Si: 3.1 mass %, Mn: 0.25 mass % and sol. Al: 0.25 mass % as a basic component and further containing C, P, B and Se in a range of C: 0.0005-0.0100 mass %, P: 0.01-0.2 mass %, B: 0.00001-0.00020 mass % and Se: 0.00001-0.00020 mass %, respectively, is melted in a vacuum melting furnace and casted into a steel ingot. In this case, each of N and S contents in all the steel ingots is controlled to a range of 0.002-0.003 mass %.

Next, the steel ingot is heated at 1100° C. for 30 minutes and hot rolled to provide a hot rolled sheet with a sheet thickness of 1.9 mm, which is subjected to a hot band annealing simulating a continuous annealing of soaking at 1000° C. for 30 seconds and cooling to a room temperature at a cooling rate of 30° C./sec. Then, the steel sheet is pickled to remove scales and cold rolled to obtain a cold rolled sheet having a final thickness of 0.20 mm. In the cold rolling, the material steel sheet (hot rolled sheet) is previously heated so as to render a sheet temperature at the outlet side of the rolling machine into 150-200° C., and then subjected to the first cold rolling for rolling to 0.50 mm and the second cold rolling (final cold rolling) at a temperature of not higher than 100° C. to obtain a cold rolled sheet with a final thickness of 0.20 mm.

The cold rolled sheet thus obtained is subjected to a finish annealing at 1000° C. for 30 seconds, and the magnetic flux density $B_{50}$ thereof is measured by an Epstein test. As a result, in the case of the steel sheets containing relatively a large amount of Al, the magnetic flux density $B_{50}$ is constant as about 1.69 T irrespective of C, B, P and Se contents. Also, the hot band annealed sheets used in this experiment are cut at a low temperature and the cross sections thereof are analyzed by an Auger electron spectroscopy. As a result, no segregation of P into the grain boundary is not found in any of the steel sheets.

As seen from the above results, the texture can be improved by adding P to the steel sheet and decreasing Al, C, B and Se contents as an element blocking P segregation without performing a warm rolling or a batch annealing. P is segregated into the grain boundary during the hot band annealing to increase grain boundary strength and change a strain distribution in the vicinity of the grain boundary in the cold rolling to thereby decrease recrystallized grains of {111}<112> generated by nucleation from grain boundary. Consequently, it is thought that recrystallized grains of {001}<250> generated by nucleation from the inside of grains (deformation band) becomes relatively preferential to provide strong integration into {001}<250>. As a way for introducing the deformation band, a warm rolling is the most effective. Moreover, the steel sheets according to the invention have a feature that the integration degree into {001}<250> is high, and, for example, an integration is hardly found in {001}<100> rotated around the <001>//ND axis by about 20°.

Although the detailed mechanism of obtaining the above effect is not clear, since Patent Document 1 points out that Al changes a grain boundary character of specified grains, there is a possibility that the grain boundary structure is changed by the decrease of Al and P is easily segregated into the grain boundary. That is, it is thought that the P segregation into the grain boundary is effectively promoted by decreasing C, B and Se as an element blocking the P segregation and further decreasing Al.

Heretofore, it has been thought that the P segregation into the grain boundary is generated through a heat treatment at a relatively low temperature for a long time. For example, Patent Document 2 discloses that the conditions of the heat treatment for segregating P are 300-600° C.×3 hr. In the case of decreasing Al, C, B and Se, however, it cannot be entirely predicted from the conventional knowledge that the P segregation is promoted even in the hot band annealing at a high temperature for a short time as mentioned above.

Next, an evaluation is carried out by a ring test in order to examine motor characteristics when the material obtained in the invention is applied to a motor core.

Each of a steel A having a chemical composition comprising C: 0.0013 mass %, Si: 3.4 mass %, Mn: 0.08 mass %, sol. Al: 0.0008 mass %, P: 0.08 mass %, S: 0.0018 mass %, N: 0.0022 mass %, B: 0.00001 mass %, Se: 0.00001 mass %, Sn: 0.03 mass % and the remainder being Fe and inevitable impurities and a steel B having a chemical composition comprising C: 0.0011 mass %, Si: 3.4 mass %, Mn: 0.09 mass %, sol. Al: 0.0010 mass %, P: 0.01 mass %, S: 0.0019 mass %, N: 0.0020 mass %, B: 0.00002 mass %, Se: 0.00001 mass %, Sn: 0.03 mass % and the remainder being Fe and inevitable impurities is melted in a vacuum melting furnace and casted into a steel ingot.

Next, the steel ingot is heated at 1120° C. for 30 minutes and hot rolled to provide a hot rolled sheet with a sheet thickness of 1.6 mm, which is subjected to a hot band annealing wherein the sheet is soaked at 1050° C. for 30 seconds and cooled to a room temperature at a cooling rate of 30° C./sec. Thereafter, the sheet is pickled to remove scales and cold rolled to obtain a cold rolled sheet having a final thickness of 0.05-0.50 mm. In the cold rolling, the material steel sheet (hot rolled sheet) is previously heated so as to render a sheet temperature at the outlet side of the rolling machine into 150-200° C., and then subjected to the first cold rolling for rolling to 0.50 mm and the second cold rolling (final cold rolling) at a temperature of not higher than 100° C. to obtain a cold rolled sheet with a final thickness.

Next, the cold rolled sheet is subjected to a finish annealing at 1000° C. for 30 seconds to obtain an annealed steel sheet, from which are punched out ring test samples having an outer diameter of 45 mm and an inner diameter of 33 mm. After the 10 samples are stacked, a primary winding wire and a secondary winding wire are wound by 100 turns for each and magnetic flux density $B_{50}$ is measured. Also, a texture of a central portion in the thickness direction of the steel sheet after the finish annealing is measured by an X-ray.

The measurement results of the magnetic flux density are shown in Table 2. As seen from the results, the magnetic flux density is increased as the final sheet thickness after the cold rolling becomes thinner in the steel sheets obtained from the steel A having a high P content, while the influence of the final sheet thickness is not observed in the steel sheets obtained from the steel B having a low P content.

In Table 2 are also shown values of S/2M and S/5C when X-ray intensity ratios of {001}<250>, {111}<112> and {001}<100> are S, M, and C, respectively. The values of S/2M and S/5C are increased as the final sheet thickness becomes thinner in the steel sheets obtained from the steel A, while such a tendency cannot be found in the steel sheets obtained from the steel B. As seen from this result, the sharpening of the texture by the P segregation into the grain boundary is remarkable especially when the final sheet thickness is thin.

This is presumed due to the fact that the sharpness of the main orientation {001}<250> in the recrystallization texture is increased by increasing the sharpness of the rolled texture. The reason why the magnetic properties of the ring are improved by such a development of the texture is considered as follows. Firstly, an axis of hard magnetization parallel to the sheet surface is decreased by the decrease of {111}<112>. Secondly, an axis of easy magnetization <100> parallel to the sheet surface is increased by the growth of {001}<250>. Thirdly, {001}<100> has four <100> orientations equivalent to the sheet surface, while {001}<250> has eight <100> orientations equivalent to the sheet surface, so that {001}<250> is more advantageous in the reduction of the in-plane anisotropy than {001}<100>.

The invention is made based on the above new knowledge.

TABLE 2

| Steel sheet No. | Steel symbol | Final sheet thickness (mm) | Magnetic flux density $B_{50}$ (T) | Texture S/2M | Texture S/5C |
|---|---|---|---|---|---|
| 1 | A | 0.50 | 1.692 | 1.26 | 1.63 |
| 2 |   | 0.45 | 1.693 | 1.22 | 1.55 |
| 3 |   | 0.40 | 1.691 | 1.24 | 1.59 |
| 4 |   | 0.35 | 1.692 | 1.23 | 1.62 |
| 5 |   | 0.30 | 1.701 | 1.32 | 1.85 |
| 6 |   | 0.25 | 1.704 | 1.40 | 1.89 |
| 7 |   | 0.20 | 1.711 | 1.51 | 2.21 |
| 8 |   | 0.15 | 1.714 | 1.59 | 2.34 |
| 9 |   | 0.10 | 1.715 | 1.61 | 2.32 |
| 10 |   | 0.05 | 1.711 | 1.53 | 2.26 |
| 11 | B | 0.50 | 1.673 | 0.93 | 0.91 |
| 12 |   | 0.45 | 1.672 | 0.94 | 0.88 |
| 13 |   | 0.40 | 1.669 | 0.92 | 0.92 |
| 14 |   | 0.35 | 1.667 | 0.91 | 0.89 |
| 15 |   | 0.30 | 1.663 | 0.89 | 0.79 |
| 16 |   | 0.25 | 1.661 | 0.87 | 0.81 |
| 17 |   | 0.20 | 1.659 | 0.88 | 0.82 |
| 18 |   | 0.15 | 1.657 | 0.85 | 0.75 |
| 19 |   | 0.10 | 1.655 | 0.82 | 0.78 |
| 20 |   | 0.05 | 1.654 | 0.76 | 0.81 |

Next, the chemical composition of the non-oriented electrical steel sheet (product sheet) of the invention is explained below.

When C is contained in an amount exceeding 0.005 mass %, P segregation during the hot band annealing is suppressed to lose an effect of increasing the magnetic flux density by P. Also, the iron loss property is deteriorated by magnetic aging. Therefore, the upper limit of C content is 0.005 mass %. Preferably, it is not more than 0.002 mass %.

Si: 1.0-5.0 Mass %

Si has an effect of increasing specific resistance of steel to decrease the iron loss, so that it is added in an amount of not less than 1.0 mass %. When it is added in an amount exceeding 5.0 mass %, steel becomes brittle to cause breakage in the cold rolling. Therefore, Si content is a range of 1.0-5.0 mass %. Preferably, it is a range of 2.5-4.0 mass %.

Mn: 0.04-3.0 Mass %

Mn has effects of preventing hot brittleness of steel and coarsening precipitates such as MnS and the like to improve grain growth and further increasing specific resistance to decrease the iron loss, so that it is added in an amount of not less than 0.04 mass %. However, when it is added in an amount exceeding 3.0 mass %, the above effects are saturated to cause the increase of the cost. Consequently, Mn content is a range of 0.04-3.0 mass %. Preferably, it is a range of 0.1-1.0 mass %.

Sol. Al: Not More than 0.005 Mass %

When Al content exceeds 0.005 mass % as sol. Al, P segregation is suppressed in the hot band annealing to lose the effect of improving the magnetic flux density by P. Also, fine AlN is increased to deteriorate grain growth. Therefore, Al content is limited to not more than 0.005 mass % as sol. Al. Preferably, it is not more than 0.002 mass %.

P: 0.03-0.2 Mass %

P is one of the most important elements in the invention and is necessary to be added in an amount of not less than 0.03 mass % in order to provide an effect of causing grain boundary segregation during the hot band annealing to improve the texture of the finish annealed sheet. However, when it is added in an amount exceeding 0.2 mass %, the above effect is saturated and also steel is embrittled to easily cause breakage in the cold rolling. Therefore, P content is a range of 0.03-0.2 mass %. Preferably, it is a range of 0.05-0.1 mass %.

S: Not More than 0.005 Mass %

When S content exceeds 0.005 mass %, precipitates such as MnS and the like are increased to block grain growth. Therefore, the upper limit of S content is 0.005 mass %. Preferably, it is not more than 0.003 mass %.

N: Not More than 0.005 Mass %

When N content exceeds 0.005 mass %, precipitates such as AlN and the like are increased to block grain growth. Therefore, the upper limit of N content is 0.005 mass %. Preferably, it is not more than 0.003 mass %.

B: Not More than 0.001 Mass %

B is necessary to be strictly regulated because it affects P segregation even in a slight amount. Particularly, when B content exceeds 0.001 mass %, P segregation during the hot band annealing is suppressed to lose the effect of improving the magnetic flux density by P. Therefore, the upper limit of B content is 0.001 mass %. Preferably, it is not more than 0.0003 mass %.

Se: Not More than 0.001 Mass %

Se affects the texture even in a slight amount like B, so that strict regulation is required. Particularly, when Se content exceeds 0.001 mass %, P segregation during the hot band annealing is suppressed to lose the effect of improving the magnetic flux density by P. Therefore, the upper limit of Se content is 0.001 mass %. Preferably, it is not more than 0.0003 mass %.

In addition that the non-oriented electrical steel sheet according to the invention satisfies the above chemical composition, sol. Al, C, B and Se blocking the P segregation into the grain boundary are necessary to satisfy the following equation:

$$\text{sol. Al} + C + 5B + 5Se \leq 0.005 \text{ mass \%}$$

When the value of the left side of the equation exceeds 0.005 mass %, the P segregation into the grain boundary in the hot band annealing is suppressed and the effect of increasing the magnetic flux density cannot be obtained. Preferably, it is not more than 0.003 mass %. Moreover, when the value of the left side is decreased to less than 0.001 mass %, the steelmaking cost is significantly increased, so that the lower limit is preferable to be approximately 0.001 mass %.

In the non-oriented electrical steel sheet according to the invention, the remainder other than the above ingredients is Fe and inevitable impurities. However, in addition to the above essential ingredients, one or more selected from the following elements may be contained for the purpose of increasing the magnetic properties and the like.

Sn, Sb: 0.01-0.2 Mass % in Each Case

Sn and Sb have an effect of decreasing {111} crystal grains of the recrystallization texture to increase the magnetic flux density, so that each element can be added in an amount of not less than 0.01 mass %. However, when they are added in an amount exceeding 0.2 mass %, the above effect is saturated. Therefore, each of Sn and Sb contents is preferably a range of 0.01-0.2 mass %. More preferably, it is a range of 0.02-0.1 mass %.

REM, Mg, Ca: 0.0005-0.005 Mass % on Each Case

REM, Mg and Ca have an effect of coarsening sulfides to improve grain growth, so that they can be added in an amount of not less than 0.0005 mass %, respectively. However, when they are added in an amount exceeding 0.005 mass %, the grain growth is rather deteriorated, so that each of REM, Mg and Ca contents is preferably a range of 0.0005-0.005 mass %. More preferably, it is a range of 0.001-0.003 mass %.

Next, the production method of the non-oriented electrical steel sheet according to the invention will be explained below.

The method of producing the non-oriented electrical steel sheet according to the invention comprises a series of steps of hot rolling a steel slab having the above-described chemical composition, subjecting to a hot band annealing, subjecting to one cold rolling or two or more cold rollings including an intermediate annealing therebetween to obtain a cold rolled sheet with a final thickness, and subjecting to a finish annealing.

First, the steel adjusted to the aforementioned chemical composition can be melted by a usual refining process. In this case, C, Al, B and Se are elements easily incorporated in the steelmaking process, so that raw material such as scrap or the like is necessary to be strictly managed. As a method of subsequently producing a raw steel material (steel slab), an ingot making-blooming method or a continuous casting method is popular. In addition to the above method, a thin cast slab having a thickness of not more than 100 mm may be produced by a direct casting method.

Next, the slab is reheated in a heating furnace and then subjected to a hot rolling, but it may be directly subjected to a hot rolling immediately after the casting without reheating. The conditions for the hot rolling are not particularly limited, so that the hot rolling may be performed according to the usual manner. Moreover, the thin cast slab may be subjected to the hot rolling or may be forwarded to the subsequent step without the hot rolling.

The hot band annealing followed to the hot rolling is conducted at a soaking temperature of 800-1200° C. for a soaking time of not more than 5 minutes. When the soaking temperature is lower than 800° C., the band texture in the hot rolling is retained to easily generate ridging, while when it exceeds 1200° C., not only the effect is saturated but also the annealing cost is increased. Also, the soaking time is not more than 5 minutes from the viewpoint of ensuring the productivity. More preferably, the soaking temperature is 900-1100° C. and the soaking time is not more than 2 minutes. Moreover, since the cooling rate after the soaking does not have a large influence on the magnetic properties, it is not particularly limited, but it is preferable to perform the cooling at a cooling rate of 1-100° C./sec from a viewpoint of productivity and production cost. As an annealing furnace, since a batch annealing furnace is low in the productivity, it is preferable to use a continuous annealing furnace.

Then, the steel sheet after the hot band annealing is pickled and subjected to a cold rolling or two or more cold rollings interposing an intermediate annealing therebetween to obtain a cold rolled sheet with a final thickness. In the case of interposing the intermediated annealing between the cold rollings, it is preferable that the annealing is conducted at a soaking temperature of 800-1200° C. for not more than 5 minutes in a continuous annealing furnace like the hot band annealing. More preferably, the soaking temperature is a range of 900-1100° C. and the soaking time is a range of 1 second to 2 minutes.

Since the cold rolling is an important step in the invention, it is preferable that a temperature of the material (sheet temperature) at the outlet side of the rolling machine in at least one pass of the final cold rolling is a range of 100-300° C. More preferably, it is a range of 130-200° C. By this treatment can be promoted the formation of the deformation band to grow {001}<250> texture. When it is lower than 100° C., the growth of {111} orientation becomes strong, while when it exceeds 300° C., the texture tends to be randomized adversely. The sheet temperature at the outlet side of the rolling machine can be measured by a radiation thermometer or a contact thermometer.

The rolling reduction of the final cold rolling is preferable to be not less than 80%. With the rolling reduction of not less than 80%, the sharpness of the texture can be enhanced to improve the magnetic properties of the ring. The upper limit of the rolling reduction is not particularly limited, but when it exceeds 98%, the rolling cost is remarkably increased, so that it is preferable to be not more than 98%. It is more preferably within a range of 85-95%.

The final thickness, or the thickness of the product sheet is preferable to be a range of 0.05-0.30 mm for increasing the rolling reduction. More preferably, it is a range of 0.10-0.20 mm.

The cold rolled sheet after the final cold rolling is then subjected to a finish annealing and, if necessary, an insulation coating is applied to provide a product sheet. Since a well-known insulation coating can be used, an inorganic coating, an organic coating and inorganic-organic coating can be properly used in accordance with required characteristics and purposes.

The non-oriented electrical steel sheet of the invention produced by the above production method has a characteristic texture with high S and low M and C when X-ray strength ratios of {001}<250>, {111}<112> and {001}<100> are S, M and C, respectively. Particularly, excellent magnetic properties can be provided with a texture wherein each of S/2M and S/5C is not less than 1.0, and more excellent magnetic properties can be provided with a texture wherein each of S/2M and S/5C is not less than 1.5. In the invention, the texture is defined with respect to the central portion in the thickness direction. It is because the texture in the vicinity of the surface layer is affected by variations of friction coefficient in the rolling and has a large scattering and a bad interrelation to the magnetic properties.

In order to measure the texture, for example, ODF may be calculated by a series expanding method or ADC method using a plurality of pole figures selected from {110}, {200}, {211} and {310} pole figures (preferably, not less than 3). As the strengths of {001}<250>, {111}<112> and {001}<100> orientations defined in the invention can be used, for example, values of (0°, 23°, 45°), (55°, 90°, 45°) and (0°, 45°, 45°) as an Eulerian angle of ($\Phi$, $\phi1$, $\phi2$) in ODF. The measurement of the texture is not limited to the above methods, and the other well-known methods can be adopted.

The non-oriented electrical steel sheet according to the invention produced by the aforementioned method is small in the in-plane anisotropy and high in the magnetic flux density, so that it can be preferably used as a material for a motor core. However, when the steel sheet is applied to a high-speed rotating motor, there is a problem that a fatigue fracture is liable to be caused in bridge portions of the rotor core. Although the reason is not clear sufficiently, since P is an element easily segregating into the crystal grain boundary after the recrystallization, it is guessed that the grain boundary strength of the product sheet is low, and when the core is formed by punching, fine intergranular cracking is caused in the vicinity of its edge face, which is a start point of the fatigue fracture.

In order to suppress the P segregation into grain boundary, it is effective to lower the finish annealing temperature. Concretely, the finish annealing temperature is preferably lower than 900° C., and more preferably lower than 800° C. Moreover, the lower limit of the finish annealing is preferable to be 600° C. from a viewpoint that a recrystallization ratio is 100% and a dislocation density is decreased sufficiently to improve the iron loss. More preferably, it is not lower than 700° C.

When the finish annealing temperature is lowered as mentioned above, the crystal grain size is made finer to increase the tensile strength. Generally, the fatigue strength (fatigue limit) becomes high as the tensile strength or yield stress (0.2% yield strength) is increased, so that the fatigue strength can be increased through the fining of the crystal grain size. In order to obtain such an effect, it is preferable that the crystal grain size of the steel sheet after the finish annealing is less than 40 μm. In this connection, the crystal grain size means an average crystal grain size measured by a method of section with respect to the rolling direction and the thickness direction from a photograph of a cross-sectional structure in the rolling direction taken by an optical microscope. More preferably, it is less than 30 μm, and further preferably less than 20 μm.

When the crystal grain size is less than 40 μm, there is a problem that the iron loss is increased to decrease the motor efficiency. For example, when an iron loss of a rotor core is small and an iron loss of a stator core is predominant as in a core of a permanent magnet type motor such as SPM, IPM or the like used in a power source for a hybrid electric vehicle (HEV), it is effective for this problem that crystal grains of the rotor core remain small, while only the stator core is subjected to a stress relief annealing to increase crystal grains to thereby decrease the iron loss. In order to obtain the above effect of decreasing the iron loss, it is preferable that the crystal grain size after the stress relief annealing is not less than 40 μm. It is more preferably not less than 70 μm, and further preferably not less than 90 μm. Moreover, the stress relief annealing may be conducted under commonly used conditions of, for example, a soaking temperature of 700-900° C. and a soaking time of 10-300 minutes.

Example 1

A slab having a chemical composition shown in Table 3 is reheated at 1100° C. for 30 minutes and hot rolled to obtain a hot rolled sheet having a thickness of 1.8 mm, which is subjected to a hot band annealing by soaking at 1020° C. for 20 seconds and cooling at 20° C./sec in a continuous annealing furnace, pickled to remove scales and cold rolled to obtain a cold rolled sheet having a final thickness of 0.20 mm. The cold rolling is performed by using a tandem rolling machine with 4 stands in which a rolling speed and a coolant content are adjusted so that the temperature at the outlet side of the stand #2 is 160° C. Next, the cold rolled sheet is subjected to a finish annealing at 1000° C. for 30 seconds in an atmosphere of dry nitrogen-hydrogen and coated with an insulation coating to provide a product sheet.

With respect to the thus obtained product sheet are measured the magnetic flux density $B_{50}$ and iron loss $W_{10/400}$ by an Epstein test, while the texture of a central portion in the thickness direction of the finish annealed sheet is measured by a X-ray to determine S/2M and S/5C when X-ray strength ratios of {001}<250>, {111}<112> and {001}<100> are S, M and C, respectively. The results are also shown in Table 3. As seen from the results, the steel sheets having the chemical composition adapted to the invention have excellent magnetic properties.

TABLE 3

| Steel sheet No. | Chemical composition (mass %) | | | | | | | | | | sol. Al + C + 5B + 5Se |
|---|---|---|---|---|---|---|---|---|---|---|---|
| | C | Si | Mn | Sol. Al | P | S | N | B | Se | Other elements | |
| 1 | 0.0019 | 3.34 | 0.12 | 0.0007 | 0.01 | 0.0012 | 0.0015 | 0.00003 | 0.00002 | — | 0.0029 |
| 2 | 0.0012 | 3.32 | 0.15 | 0.0005 | 0.03 | 0.0016 | 0.0014 | 0.00008 | 0.00001 | — | 0.0022 |
| 3 | 0.0021 | 3.34 | 0.09 | 0.0008 | 0.03 | 0.0015 | 0.0013 | 0.00012 | 0.00010 | — | 0.0040 |
| 4 | 0.0028 | 3.39 | 0.14 | 0.0016 | 0.03 | 0.0014 | 0.0016 | 0.00018 | 0.00016 | — | 0.0061 |
| 5 | 0.0011 | 3.34 | 0.12 | 0.0006 | 0.07 | 0.0009 | 0.0011 | 0.00003 | 0.00005 | — | 0.0021 |
| 6 | 0.0019 | 3.29 | 0.11 | 0.0009 | 0.07 | 0.0011 | 0.0008 | 0.00014 | 0.00004 | — | 0.0037 |
| 7 | 0.0023 | 3.26 | 0.08 | 0.0012 | 0.07 | 0.0014 | 0.0009 | 0.00042 | 0.00021 | — | 0.0067 |
| 8 | 0.0015 | 3.31 | 0.13 | 0.0007 | 0.14 | 0.0011 | 0.0016 | 0.00004 | 0.00006 | — | 0.0027 |
| 9 | 0.0022 | 3.41 | 0.15 | 0.0011 | 0.14 | 0.0016 | 0.0014 | 0.00013 | 0.00003 | — | 0.0041 |
| 10 | 0.0027 | 3.36 | 0.15 | 0.0016 | 0.14 | 0.0015 | 0.0012 | 0.00015 | 0.00042 | — | 0.0072 |
| 11 | 0.0012 | 3.35 | 0.16 | 0.0008 | 0.24 | 0.0018 | 0.0016 | 0.00012 | 0.00005 | — | 0.0029 |
| 12 | 0.0015 | 3.31 | 1.24 | 0.0011 | 0.06 | 0.0001 | 0.0013 | 0.00002 | 0.00001 | — | 0.0028 |
| 13 | 0.0013 | 3.35 | 0.09 | 0.0004 | 0.08 | 0.0012 | 0.0015 | 0.00001 | 0.00001 | Sn: 0.05 | 0.0018 |
| 14 | 0.0016 | 3.41 | 0.35 | 0.0006 | 0.08 | 0.0007 | 0.0021 | 0.00003 | 0.00005 | Sb: 0.06 | 0.0026 |
| 15 | 0.0015 | 3.35 | 0.21 | 0.0011 | 0.07 | 0.0026 | 0.0005 | 0.00001 | 0.0015 | REM: 0.0015 | 0.0029 |
| 16 | 0.0021 | 3.35 | 0.55 | 0.0005 | 0.07 | 0.0021 | 0.0018 | 0.00002 | 0.00001 | Mg: 0.0012 | 0.0028 |
| 17 | 0.0016 | 3.40 | 0.08 | 0.0003 | 0.08 | 0.0019 | 0.0016 | 0.00003 | 0.00006 | Ca: 0.0018 | 0.0024 |
| 18 | 0.0013 | 3.36 | 0.09 | 0.0007 | 0.06 | 0.0022 | 0.0009 | 0.00010 | 0.00004 | Sn: 0.05, Ca: 0.0025 | 0.0027 |
| 19 | 0.0022 | 3.36 | 0.54 | 0.0004 | 0.06 | 0.0015 | 0.0018 | 0.00001 | 0.00001 | Sb: 0.06, REM: 0.0021 | 0.0027 |
| 20 | 0.0022 | 3.26 | 0.06 | 0.0006 | 0.06 | 0.0063 | 0.0012 | 0.00001 | 0.00001 | — | 0.0029 |
| 21 | 0.0012 | 3.31 | 0.19 | 0.0010 | 0.06 | 0.0065 | 0.0004 | 0.00001 | 0.00004 | — | 0.0026 |
| 22 | 0.0061 | 3.25 | 0.08 | 0.0005 | 0.07 | 0.0012 | 0.0013 | 0.00002 | 0.00001 | — | 0.0068 |
| 23 | 0.0022 | 3.29 | 0.12 | 0.0063 | 0.06 | 0.0014 | 0.0009 | 0.00001 | 0.00001 | — | 0.0086 |
| 24 | 0.0016 | 3.34 | 0.18 | 0.0002 | 0.06 | 0.0014 | 0.0009 | 0.0016 | 0.00001 | — | 0.0099 |
| 25 | 0.0018 | 3.31 | 0.16 | 0.0004 | 0.07 | 0.0008 | 0.0011 | 0.00001 | 0.0016 | — | 0.0103 |

TABLE 3-continued

| Steel sheet No. | Magnetic properties | | Texture | | Remarks |
|---|---|---|---|---|---|
| | Magnetic flux density $B_{50}$(T) | Iron loss $W_{10/400}$ (W/kg) | S/2M | S/5C | |
| 1 | 1.663 | 10.68 | 0.85 | 0.79 | Comparative Example |
| 2 | 1.675 | 10.23 | 1.21 | 1.18 | Invention Example |
| 3 | 1.669 | 10.31 | 1.16 | 1.08 | Invention Example |
| 4 | 1.664 | 10.65 | 0.87 | 0.82 | Comparative Example |
| 5 | 1.691 | 9.67 | 1.63 | 2.03 | Invention Example |
| 6 | 1.683 | 9.97 | 1.48 | 1.89 | Invention Example |
| 7 | 1.665 | 10.72 | 0.86 | 0.82 | Comparative Example |
| 8 | 1.688 | 9.95 | 1.58 | 1.99 | Invention Example |
| 9 | 1.682 | 10.05 | 1.42 | 1.83 | Invention Example |
| 10 | 1.664 | 10.62 | 0.86 | 0.85 | ComparativeExample |
| 11 | Not measured due to cracks caused in cold rolling | | | | Comparative Example |
| 12 | 1.682 | 9.31 | 1.61 | 1.92 | Invention Example |
| 13 | 1.705 | 9.53 | 1.81 | 2.25 | Invention Example |
| 14 | 1.702 | 9.59 | 1.79 | 2.13 | Invention Example |
| 15 | 1.688 | 9.42 | 1.55 | 1.81 | Invention Example |
| 16 | 1.689 | 9.45 | 1.57 | 1.85 | Invention Example |
| 17 | 1.691 | 9.38 | 1.61 | 1.91 | Invention Example |
| 18 | 1.704 | 9.31 | 1.86 | 2.18 | Invention Example |
| 19 | 1.703 | 9.35 | 1.83 | 2.21 | Invention Example |
| 20 | 1.671 | 12.15 | 1.05 | 1.09 | Comparative Example |
| 21 | 1.668 | 11.98 | 0.99 | 0.98 | Comparative Example |
| 22 | 1.661 | 11.24 | 0.86 | 0.86 | Comparative Example |
| 23 | 1.659 | 12.56 | 0.81 | 0.75 | Comparative Example |
| 24 | 1.662 | 12.23 | 0.86 | 0.78 | Comparative Example |
| 25 | 1.662 | 12.23 | 0.86 | 0.78 | Comparative Example |

Example 2

A steel slab having a chemical composition comprising C: 0.0015 mass %, Si: 3.2 mass %, Mn: 0.18 mass %, sol. Al: 0.0008 mass %, P: 0.07 mass %, S: 0.0015 mass %, N: 0.0018 mass %, B: 0.00001 mass %, Se: 0.00001 mass %, Sn: 0.06 mass % and the remainder being Fe and inevitable impurities is reheated at 1100° C. for 30 minutes and hot rolled to provide a hot rolled sheet having a sheet thickness of 1.6 mm, which is subjected to a hot band annealing by soaking at 1050° C. for 60 seconds and cooling at 25° C./sec in a continuous annealing furnace, pickled to remove scales and cold rolled to obtain a cold rolled sheet having a final thickness of 0.05-0.50 mm. The cold rolling is performed by using a tandem rolling machine with 4 stands in which a rolling speed and a coolant content are adjusted so as to control a sheet temperature at the outlet side of the stand #3 as shown in Table 4. Next, the cold rolled sheet is subjected to a finish annealing at 1000° C. for 10 seconds in an atmosphere of dry nitrogen-hydrogen and coated with an insulation coating to provide a product sheet.

10 ring test samples having an outer diameter of 45 mm and an inner diameter of 33 mm are punched out from the thus obtained product sheet and stacked, and a primary coil and a secondary coil are wound therearound by 100 turn for each to measure magnetic flux density $B_{50}$ and iron loss $W_{10/400}$. Also, the texture (S/2M, S/5C) of the central portion in the thickness direction of the steel sheet after the finish annealing is measured by X-rays, the results of which are also shown in Table 4. As seen from the results, the steel sheets produced under the conditions adapted to the invention are high in the magnetic flux density and excellent in the magnetic properties.

TABLE 4

| Steel sheet No. | Cold rolling conditions | | Magnetic properties | | Texture | | Remarks |
|---|---|---|---|---|---|---|---|
| | Temperature at outlet side of stand #3 (° C.) | Final thickness (mm) | Magnetic flux density $B_{50}$ (T) | Iron loss $W_{10/400}$ (W/kg) | S/2M | S/5C | |
| 1 | 50 | 0.50 | 1.678 | 31.59 | 1.05 | 1.04 | Invention Example |
| 2 | 100 | 0.50 | 1.688 | 30.12 | 1.21 | 1.59 | Invention Example |
| 3 | 200 | 0.50 | 1.692 | 29.51 | 1.26 | 1.63 | Invention Example |
| 4 | 300 | 0.50 | 1.690 | 29.92 | 1.23 | 1.64 | Invention Example |
| 5 | 400 | 0.50 | 1.681 | 31.21 | 1.07 | 1.08 | Invention Example |
| 6 | 200 | 0.30 | 1.701 | 12.65 | 1.36 | 1.86 | Invention Example |
| 7 | 200 | 0.20 | 1.712 | 9.63 | 1.53 | 2.04 | Invention Example |
| 8 | 200 | 0.15 | 1.715 | 9.16 | 1.62 | 2.24 | Invention Example |
| 9 | 200 | 0.10 | 1.716 | 8.52 | 1.65 | 2.43 | Invention Example |
| 10 | 200 | 0.05 | 1.709 | 7.21 | 1.56 | 2.18 | Invention Example |

Example 3

A slab having a chemical composition shown in Table 5 is reheated at 1120° C. for 20 minutes and hot rolled to obtain a hot rolled sheet having a thickness of 1.7 mm. Next, the hot rolled sheet is subjected to a hot band annealing by soaking at 990° C. for 40 seconds and cooling at 23° C./sec in a continuous annealing furnace, pickled and cold rolled to obtain a cold rolled sheet having a final thickness of 0.14 mm. The cold rolling is performed by using a tandem rolling machine with 4 stands in which a rolling speed and a coolant content are adjusted so that the temperature at the outlet side of the second pass is 150° C. Next, the cold rolled sheet is subjected to a finish annealing by soaking at a temperature shown in Table 5 in an atmosphere of dry nitrogen-hydrogen for 30 seconds and coated with an insulation coating to provide a product sheet.

Magnetic flux density $B_{50}$ and iron loss $W_{10/400}$ of the product sheet are measured by an Epstein method.

Also, an average crystal grain size of a cross-section in the rolling direction of the product sheet is measured by a method of section, and a texture (S/2M, S/5C) of a central portion in in the thickness direction is measured by X-rays.

Further, a JIS No. 5 tensile test specimen and a fatigue test specimen (a width of a parallel portion is 10 mm and a length is 200 mm, and the parallel portion is polished with a #800 emery paper) are prepared, which are subjected to a tensile test at a room temperature to measure 0.2% yield strength and further to a fatigue test to measure a fatigue limit. Here, the measurement of the fatigue limit is conducted under conditions that a stress ratio is 0.1 (tension-tension), a frequency is 20 Hz and a maximum repetition number is $10^7$.

Further, the product sheet is subjected to a stress relief annealing at 780° C. in an atmosphere of $N_2$ for 2 hours, and the magnetic properties, average crystal grain size and texture (S/2M, S/5C) are measured in the same manner as mentioned above.

The measurement results are also shown in Table 5. As seem from the results, the fatigue limit of the steel sheet having a chemical composition adapted to the invention is decreased when the finish annealing temperature is not lower than 900° C., but a higher fatigue limit can be ensured when the finish annealing temperature is lower than 900° C. Also, the steel sheet provides excellent iron loss and magnetic flux density by the stress relief annealing.

TABLE 5

| Steel sheet No. | Steel No. in Table 3 | Finish annealing temperature (° C.) | Characteristics of product sheet ||||||| 
|---|---|---|---|---|---|---|---|---|---|
| | | | Crystal grain size (μm) | Magnetic flux density $B_{50}$ (T) | Iron loss $W_{10/400}$ (W/kg) | 0.2% yield strength (MPa) | Fatigue limit (MPa) | S/2M | S/5C |
| 1 | 1 | 750 | 17 | 1.654 | 18.21 | 501 | 440 | 0.82 | 0.76 |
| 2 | | 1000 | 104 | 1.653 | 9.36 | 399 | 380 | 0.81 | 0.75 |
| 3 | 5 | 760 | 16 | 1.693 | 18.01 | 499 | 450 | 1.65 | 2.02 |
| 4 | | 840 | 25 | 1.691 | 14.26 | 447 | 380 | 1.61 | 1.99 |
| 5 | | 930 | 52 | 1.694 | 11.92 | 423 | 330 | 1.63 | 2.03 |
| 6 | | 990 | 101 | 1.692 | 9.23 | 392 | 320 | 1.64 | 2.04 |
| 7 | 7 | 750 | 15 | 1.654 | 18.22 | 503 | 440 | 0.81 | 0.75 |
| 8 | | 820 | 22 | 1.656 | 14.96 | 453 | 420 | 0.80 | 0.77 |
| 9 | | 940 | 56 | 1.655 | 12.01 | 413 | 390 | 0.79 | 0.74 |
| 10 | | 1000 | 99 | 1.653 | 9.42 | 395 | 380 | 0.81 | 0.76 |
| 11 | 13 | 770 | 18 | 1.704 | 17.52 | 502 | 440 | 1.82 | 2.13 |
| 12 | | 880 | 38 | 1.701 | 13.37 | 434 | 380 | 1.81 | 2.16 |
| 13 | | 930 | 55 | 1.704 | 11.83 | 422 | 320 | 1.79 | 2.17 |
| 14 | | 1000 | 95 | 1.703 | 9.54 | 405 | 310 | 1.80 | 2.14 |
| 15 | 17 | 750 | 15 | 1.691 | 18.12 | 505 | 430 | 1.57 | 1.85 |
| 16 | | 830 | 26 | 1.692 | 14.16 | 445 | 400 | 1.57 | 1.88 |
| 17 | | 920 | 59 | 1.689 | 11.52 | 415 | 320 | 1.59 | 1.86 |
| 18 | | 990 | 105 | 1.690 | 9.12 | 396 | 300 | 1.58 | 1.88 |
| 19 | 18 | 780 | 19 | 1.703 | 16.40 | 489 | 440 | 1.83 | 2.14 |
| 20 | | 890 | 39 | 1.706 | 13.16 | 442 | 420 | 1.81 | 2.11 |
| 21 | | 930 | 61 | 1.705 | 11.46 | 418 | 330 | 1.85 | 2.09 |
| 22 | | 1010 | 104 | 1.704 | 9.13 | 395 | 310 | 1.82 | 2.12 |
| 23 | 19 | 760 | 16 | 1.698 | 18.33 | 495 | 420 | 1.82 | 2.13 |
| 24 | | 840 | 27 | 1.701 | 14.32 | 455 | 410 | 1.84 | 2.17 |
| 25 | | 950 | 73 | 1.699 | 10.70 | 413 | 330 | 1.82 | 2.14 |
| 26 | | 990 | 101 | 1.702 | 9.21 | 402 | 320 | 1.81 | 2.16 |

| Steel sheet No. | Characteristics after stress relief annealing ||||| Remarks |
|---|---|---|---|---|---|---|
| | Average crystal grain size (μm) | Magnetic flux density $B_{50}$(T) | Iron loss $W_{10/400}$ (W/kg) | S/2M | S/5C | |
| 1 | 104 | 1.654 | 9.27 | 0.81 | 0.74 | Comparative Example |
| 2 | 106 | 1.653 | 9.24 | 0.80 | 0.76 | Comparative Example |
| 3 | 103 | 1.693 | 9.13 | 1.62 | 2.03 | Invention Example |
| 4 | 105 | 1.696 | 9.12 | 1.68 | 2.02 | Invention Example |
| 5 | 106 | 1.695 | 9.15 | 1.64 | 2.01 | Invention Example |
| 6 | 102 | 1.694 | 9.14 | 1.63 | 2.06 | Invention Example |
| 7 | 102 | 1.661 | 9.21 | 0.82 | 0.76 | Comparative Example |
| 8 | 99 | 1.660 | 9.19 | 0.79 | 0.76 | Comparative Example |
| 9 | 101 | 1.663 | 9.23 | 0.81 | 0.75 | Comparative Example |
| 10 | 100 | 1.662 | 9.22 | 0.82 | 0.77 | Comparative Example |

TABLE 5-continued

| | | | | | | |
|---|---|---|---|---|---|---|
| 11 | 100 | 1.704 | 9.18 | 1.80 | 2.18 | Invention Example |
| 12 | 101 | 1.703 | 9.19 | 1.83 | 2.13 | Invention Example |
| 13 | 99 | 1.706 | 9.21 | 1.78 | 2.15 | Invention Example |
| 14 | 98 | 1.705 | 9.23 | 1.82 | 2.16 | Invention Example |
| 15 | 104 | 1.693 | 9.08 | 1.58 | 1.83 | Invention Example |
| 16 | 105 | 1.693 | 9.11 | 1.59 | 1.84 | Invention Example |
| 17 | 103 | 1.695 | 9.09 | 1.57 | 1.87 | Invention Example |
| 18 | 105 | 1.694 | 9.06 | 1.60 | 1.85 | Invention Example |
| 19 | 101 | 1.703 | 9.07 | 1.86 | 2.11 | Invention Example |
| 20 | 103 | 1.706 | 9.11 | 1.82 | 2.14 | Invention Example |
| 21 | 102 | 1.706 | 9.08 | 1.84 | 2.11 | Invention Example |
| 22 | 105 | 1.705 | 9.05 | 1.83 | 2.08 | Invention Example |
| 23 | 101 | 1.699 | 9.09 | 1.82 | 2.14 | Invention Example |
| 24 | 102 | 1.702 | 9.14 | 1.81 | 2.15 | Invention Example |
| 25 | 99 | 1.703 | 9.13 | 1.84 | 2.16 | Invention Example |
| 26 | 101 | 1.702 | 9.11 | 1.83 | 2.12 | Invention Example |

The invention claimed is:

1. A non-oriented electrical steel sheet having a chemical composition comprising C: not more than 0.005 mass %, Si: 1.0-5.0 mass %, Mn: 0.04-3.0 mass %, sol. Al: not more than 0.005 mass %, P: 0.03-0.2 mass %, S: not more than 0.005 mass %, N: not more than 0.005 mass %, B: not more than 0.001 mass %, Se: not more than 0.001 mass %, provided that sol. Al, C, B and Se satisfy the following equation:

sol. Al+C+5B+5Se≤0.005 mass %, and the remainder being Fe and inevitable impurities, wherein S/2M is not less than 1.0 and S/5C is not less than 1.0 wherein X-ray intensity ratios of {001}<250>, {111}<112> and {001}<100> in a central layer in a thickness direction are defined as S, M and C, respectively.

2. The non-oriented electrical steel sheet according to claim 1, wherein the chemical composition of the non-oriented electrical steel sheet further contains at least one of the following Group A and Group B:
   Group A: one or two selected from Sn: 0.01-0.2 mass % and Sb: 0.01-0.2 mass %, and
   Group B: one or more selected from REM: 0.0005-0.005 mass %, Mg: 0.0005-0.005 mass % and Ca: 0.0005-0.005 mass %.

3. The non-oriented electrical steel sheet according to claim 1, wherein an average crystal grain size is less than 40 µm.

4. The non-oriented electrical steel sheet according to claim 2, wherein an average crystal grain size is less than 40 µm.

5. A method of producing a non-oriented electrical steel sheet comprising a series of steps of hot rolling a steel slab having a chemical composition as claimed in claim 1, conducting a hot band annealing at a soaking temperature of 800-1200° C. for a soaking time of not more than 5 minutes, performing one cold rolling or two or more cold rollings interposing an intermediate annealing therebetween to obtain a cold rolled sheet with a final thickness and subjecting the sheet to finish annealing, wherein a temperature of the sheet at an outlet side of a rolling machine in at least one pass of the final cold rolling is set to a range of 100-300° C., thereby resulting in the non-oriented electrical steel sheet having S/2M being not less than 1.0 and S/5C being not less than 1.0 wherein X-ray intensity ratios of {001}<250>, {111}<112> and {001}<100> in a central layer in a thickness direction are defined as S M and C, respectively.

6. A method of producing a non-oriented electrical steel sheet comprising a series of steps of hot rolling a steel slab having a chemical composition as claimed in claim 2, conducting a hot band annealing at a soaking temperature of 800-1200° C. for a soaking time of not more than 5 minutes, performing one cold rolling or two or more cold rollings interposing an intermediate annealing therebetween to obtain a cold rolled sheet with a final thickness and subjecting the sheet to finish annealing, wherein a temperature of the sheet at an outlet side of a rolling machine in at least one pass of the final cold rolling is set to a range of 100-300° C., thereby resulting in the non-oriented electrical steel sheet having S/2M being not less than 1.0 and S/5C being not less than 1.0 wherein X-ray intensity ratios of {001}<250>, {111}<112> and {001}<100> in a central layer in a thickness direction are defined as S, M and C, respectively.

7. The method of producing a non-oriented electrical steel sheet according to claim 5, wherein a rolling reduction of the final cold rolling is not less than 80%.

8. The method of producing a non-oriented electrical steel sheet according to claim 6, wherein a rolling reduction of the final cold rolling is not less than 80%.

9. The method of producing a non-oriented electrical steel sheet according to claim 5, wherein a soaking temperature in the finish annealing is greater than or equal to 600° C. and less than 900° C.

10. The method of producing a non-oriented electrical steel sheet according to claim 6, wherein a soaking temperature in the finish annealing is greater than or equal to 600° C. and less than 900° C.

11. The method of producing a non-oriented electrical steel sheet according to claim 7, wherein a soaking temperature in the finish annealing is greater than or equal to 600° C. and less than 900° C.

12. The method of producing a non-oriented electrical steel sheet according to claim 8, wherein a soaking temperature in the finish annealing is greater than or equal to 600° C. and less than 900° C.

13. A motor core comprising a stator core and a rotor core formed by laminating non-oriented electrical steel sheet as claimed in claim 1, wherein an average crystal grain size of the rotor core is less than 40 µm and an average crystal grain size of the stator core is not less than 40 µm.

14. A motor core comprising a stator core and a rotor core formed by laminating non-oriented electrical steel sheet as claimed in claim 2, wherein an average crystal grain size of the rotor core is less than 40 µm and an average crystal grain size of the stator core is not less than 40 µm.

15. A method of producing a motor core comprising a stator core and a rotor core formed by laminating non-oriented electrical steel sheet according to claim 3, wherein an average crystal grain size of the stator core is made to not less than 40 µm by subjecting to a stress relief annealing.

16. A method of producing a motor core comprising a stator core and a rotor core formed by laminating non-oriented electrical steel sheet according to claim 4, wherein an average crystal grain size of the stator core is made to not less than 40 μm by subjecting to a stress relief annealing.

* * * * *